United States Patent [19]
Robinson

[11] Patent Number: 5,533,478
[45] Date of Patent: Jul. 9, 1996

[54] DISCRETE FILTER AND PRESSURE REGULATOR MOUNTING FOR A FUEL RAIL

[75] Inventor: Barry S. Robinson, Newport News, Va.

[73] Assignee: Siemens Automotive L.P., Auburn Hills, Mich.

[21] Appl. No.: 226,906

[22] Filed: Apr. 13, 1994

[51] Int. Cl.⁶ .......................... F02M 37/04; B01D 27/00
[52] U.S. Cl. .......................... 123/510; 123/456; 137/549; 210/446; 210/416.4
[58] Field of Search .................... 123/510, 456, 123/468, 469, 470, 514; 137/547, 549; 261/DIG. 40; 210/416.4, 435, 446

[56] References Cited

U.S. PATENT DOCUMENTS

| | | | |
|---|---|---|---|
| 55,822 | 6/1866 | Cornelius | 137/549 |
| 4,601,820 | 7/1986 | Leeson | 210/446 |
| 4,759,842 | 7/1988 | Frees | 210/446 |
| 4,959,141 | 9/1990 | Anderson | 137/549 |
| 5,066,391 | 11/1991 | Faria | 210/416.4 |
| 5,078,167 | 1/1992 | Brandt | 137/549 |
| 5,094,747 | 3/1992 | Johnson | 210/416.4 |
| 5,149,433 | 9/1992 | Lien | 210/416.4 |
| 5,365,906 | 11/1994 | Deweerot | 123/510 |

Primary Examiner—Carl S. Miller
Attorney, Agent, or Firm—Russel C. Wells

[57] ABSTRACT

This disclosure relates to a discrete fuel filter having a tubular filter cartridge in its own socket in a filter housing. The socket is mounted in fluid communication with the inlet of a fuel rail for an internal combustion engine. In another embodiment, a fuel pressure regulator is operatively connected to be in fluid communication with the output of the filter and the input of the fuel rail. In each application the unfiltered fuel flows through the filter media from the input of the filter housing to the outlet of the filter housing.

8 Claims, 2 Drawing Sheets

FUEL INJECTORS

DISCRETE FILTER AND PRESSURE REGULATOR MOUNTING FOR A FUEL RAIL

FIELD OF THE INVENTION

This invention relates generally to a fuel system of an internal combustion engine, and more specifically to a fuel rail assembly that contains electrically operated fuel injectors and a filter for filtering foreign material from fuel upon entering the fuel rail assembly so that the foreign material does not reach the internal mechanism of the fuel injectors where it may impair proper performance.

BACKGROUND AND SUMMARY OF THE INVENTION

It is known to use filter screens in fuel injection systems for filtering foreign material from the fuel so that such foreign material does not reach vital parts of the fuel rail assembly. The potentially adverse consequences of particulate material entering a fuel injector, or other operative component of a fuel rail assembly, have been documented and need not be repeated here. It also known to use cartridge type fuel filter elements in fuel systems. However, insofar as the Applicant is aware, it has not heretofore not been proposed to use a tubular filter cartridge as a discrete element replaceably mounted in its own socket in a fuel rail for filtering foreign material from fuel before the fuel reaches vital components of the fuel rail assembly.

The present invention relates to the incorporation of a tubular filter cartridge in its own socket in a fuel rail and to a number of novel, advantageous features via which the filter cartridge is associated with a fuel rail. These features include: the integration of a tubular filter cartridge into a cylindrical cartridge housing that separably mounts in its own socket in the fuel rail to allow for removal and replacement; the incorporation of certain features on the exterior of the cartridge housing to provide a secure fit of the housing within the fuel rail socket; the incorporation of certain features that provide a convenient flow path for the fuel being filtered; and fluid-tight joints between the cartridge housing and the socket. In one particular embodiment, the cartridge housing includes an inlet connector fitting (an example being a so-called quick connect fitting) that is integrally formed with the cartridge housing and provides for connection of a fuel supply conduit to the fuel rail assembly. In another particular embodiment, the filter cartridge is not contained within a cartridge housing but rather is disposed directly within the fuel rail socket and retained therein by means of a closure plug that removably closes an open end of the socket to capture the filter cartridge in the socket in a secure and sealed manner.

Further features and advantages will be seen from the following detailed description of a presently preferred embodiment. Claims and drawings accompany the description, and the drawings and description disclose the best mode contemplated at this time for carrying out the invention.

DESCRIPTION OF THE PREFERRED EMBODIMENT

Figure 1:
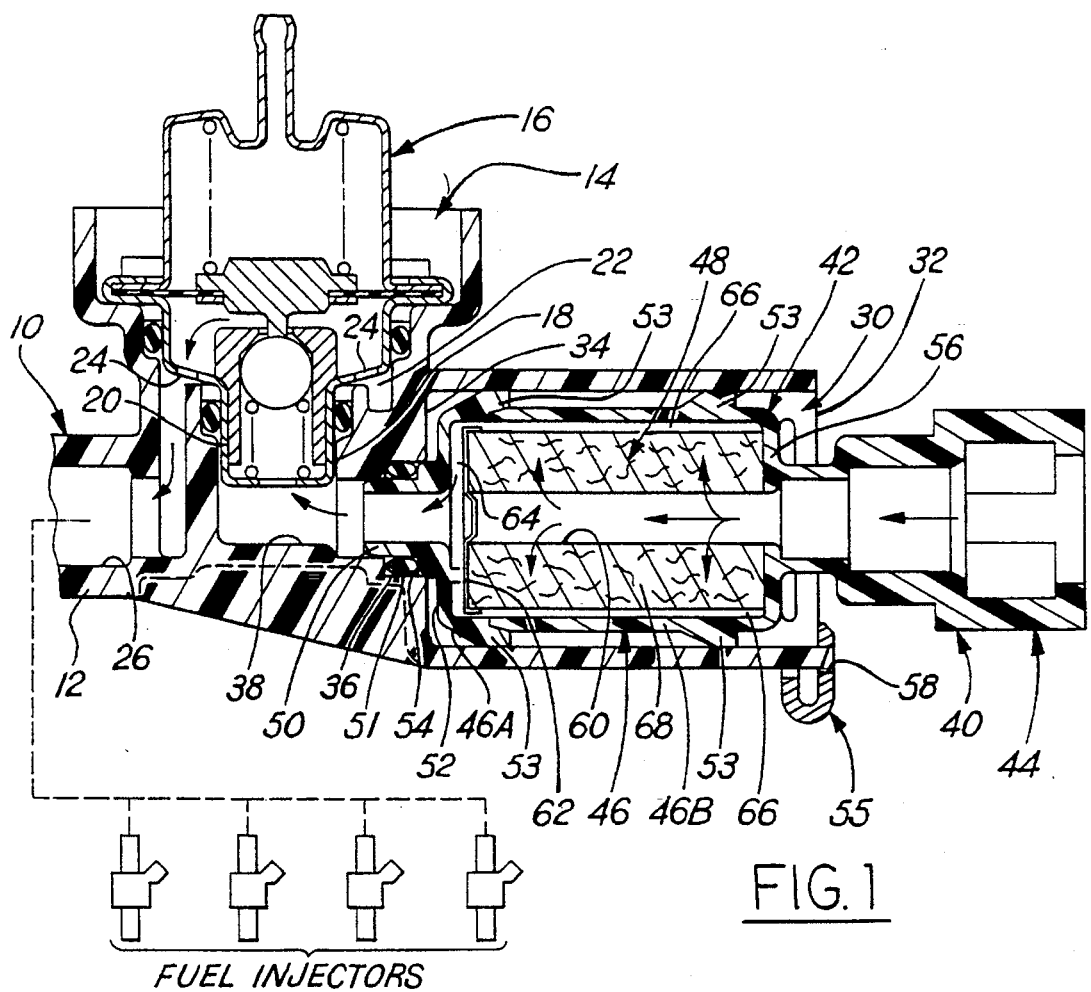
FIG. 1 is a longitudinal cross-sectional view through an inlet end portion of a first embodiment of fuel rail assembly embodying principles of the present invention.

FIG. 1 shows a fuel rail assembly 10 comprising a fuel rail 12 that serves fuel to a number of electrically operated fuel injectors at various locations along its length. The fuel injectors are not shown in detail and are represented only schematically. Fuel rail 12 may be constructed in any conventional way, from metal parts assembled together, or from molded composite material as shown by the example in the drawings. Fuel rail 12 includes a first integral cylindrical socket 14 whose axis is transverse to the length of the fuel rail and within which a fuel pressure regulator 16 is coaxially disposed and in a fluid-tight manner. This fuel pressure regulator is like that disclosed in the commonly assigned co-pending patent application of the present inventor and Michael J. Hornby, Ser. No. 08/092,320, filed Jul. 14, 1993, and details may be obtained from that file. Socket 14 comprises a series of steps shaped for cooperation with the housing of regulator 16. The bottom of socket 14 is shaped to comprise an inlet 18 with which a tubular inlet port 20 of regulator 16 is telescopically engaged in a sealed manner. The socket further comprises an annular well 22 that is disposed in surrounding relation to, but sealed off from, inlet 18. Fuel that passes through inlet port 20 into an interior fuel chamber of regulator 16 is pressure regulated by the internal mechanism of the regulator and this interior fuel chamber communicates with well 22 by several through-apertures 24 in the wall of the regulator housing. Well 22 in turn leads to a main fuel passage 26 that extends lengthwise through the fuel rail to serve the fuel injectors. The pressure regulator's internal mechanism includes a relief feature that relieves excess pressure back through inlet port 20 so that the regulator does not require a separate fuel return conduit extending back to the tank.

At its fuel inlet end, fuel rail 12 comprises a second integral cylindrical socket 30 that is coaxial with the length of the fuel rail. Socket 30 is open at one axial end 32 and has two internal shoulders 34, 36 at the opposite axial end for successively reducing the I.D. of the socket at that latter location, but leaving that end open for communication through a short passage 38 to which inlet port 20 of regulator 16 is communicated.

A combination inlet connector fitting-filter cartridge and housing assembly 40 is disposed in association with socket 30 for conveying fuel from a fuel supply conduit (not shown) to the pressure regulator inlet port and filtering the fuel in the process. The filter cartridge and housing portion 42 of assembly 40 is disposed within socket 30 while the inlet connector fitting portion 44 is disposed external to the socket where it is available for connection with a mating connector (not shown) on the fuel supply conduit that delivers fuel to the fuel rail assembly.

Portion 42 comprises a cylindrically shaped housing 46 within which a tubular filter cartridge 48 is disposed. Housing 46 is preferably fabricated from molded plastic parts that are joined together in a sealed manner. In FIG. 1, there are two such parts 46A and 46B. Part 46B forms a majority of housing 46, and it includes inlet connector fitting portion 44 as an integral part thereof such that the inlet connector fitting is integrally formed at one end of part 46B during the process of fabricating the latter. The opposite end of part 46B comes together with a mating end of part 46A in a fluid-tight joint that may be created in any suitable manner such as by sonic welding. The opposite end of part 46A has a neck 50 including successive shoulders 52, 54 that fit complementary to the interior end of socket 30 that comprises the counterbores that form shoulders 34, 36. An O-ring seal 51 is disposed around neck 50 to provide a fluid-tight seal of the neck with the inner end of socket 30 that receives the neck.

The cartridge housing wall is imperforate except for the entrance where connector fitting portion 44 joins it and for the exit formed by neck 50. The housing sidewall's O.D. also includes several projections 53 that are slightly crushable to allow the housing to have a secure fit when inserted into socket 30 through open end 32. After the cartridge housing portion has been fully inserted into socket 30, a retention clip 55 is engaged with the socket wall proximate open end 32 to hold assembly 40 in place by engaging an end wall 56 of the cartridge housing at locations that are to either side of where connector fitting portion 44 integrally joins with end wall 56. The retention clip has a feature 58 that causes it to be self-retaining on the edge of open end 32 when fully in place. Details of the retention clip and how it is associated with the socket end are like the embodiment shown in the commonly assigned co-pending patent application of the present inventor entitled "Fuel Pressure Regulator/Fuel Filter Module" Ser. No. 08/226,912; filed Apr. 13, 1994.

Filter cartridge 48 is tubular in shape and disposed coaxially within the cartridge housing such that one axial end of the filter cartridge is disposed against and joined with the interior face of end wall 56 so that a central passage 60 through the filter cartridge aligns with inlet connector fitting portion 44. The opposite axial end of cartridge 48, including passage 60, is covered by an imperforate cap 62 that is axially inwardly of neck 50 to provide a space 64. The O.D. of the cartridge is less than the I.D. of the cartridge housing so that there is an annular space 66 surrounding the sidewall of the cartridge. Fuel that enters from the inlet connector fitting passes into passage 60 and then radially outwardly through filter media 68 to space 66. From there, the fuel passes to space 64, through neck 50 and passage 38, to the fuel pressure regulator inlet port 20. Media 68 is effective to filter certain particulate material from the fuel as it passes through.

Assembly 40 is serviceable as a unit by disconnecting the fuel supply tube from inlet connector fitting portion 44, removing clip 55, and extracting the assembly from socket 30.

Figure 2:
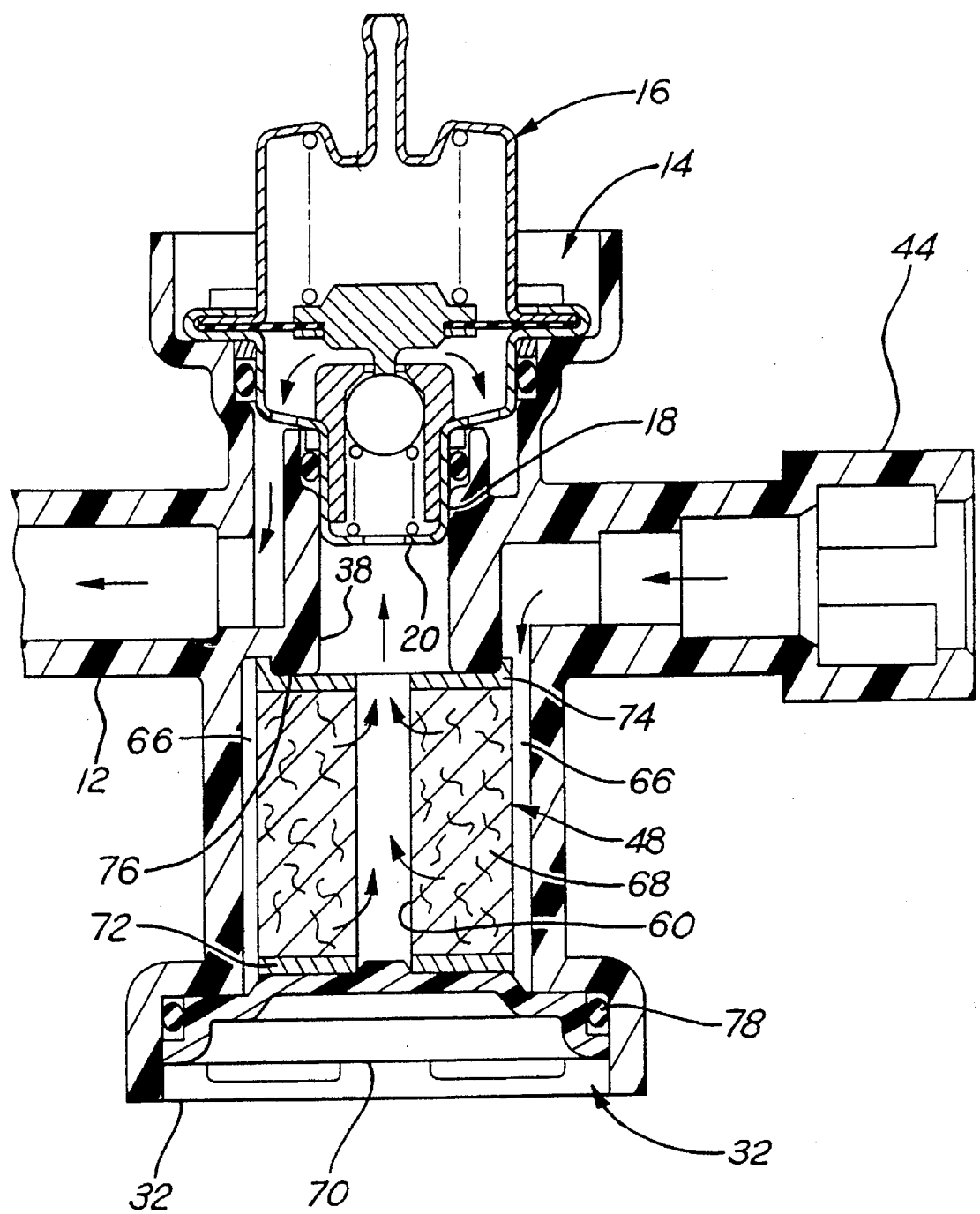
FIG. 2 is a longitudinal cross-sectional view through an inlet end portion of a second embodiment of fuel rail assembly embodying principles of the present invention.

Parts of FIG. 2 that correspond to parts of FIG. 1 will be identified by like numbers. In FIG. 2, the inlet connector portion 44 is integrally formed with the fuel rail 12 at one axial end thereof. The socket 32 is integrally formed with fuel rail 12, but it is disposed diametrically opposite and in alignment with socket 14. A removable imperforate closure plug 70 is disposed with socket 32 to close open end 32 and to securely retain filter cartridge 48 in the socket. The filter cartridge in FIG. 2 has no housing. The annular end faces of the filter cartridge comprise imperforate annular walls 72, 74. An annular zone of plug 70 engages wall 72 to in turn force wall 74 against the annular entrance end 76 of the wall that forms passage 38. A central region of plug 70 closes the end of passage 60 that is surrounded by wall 72. The outer margin of plug 70 is shaped for cooperation with the outer portion of socket 32 to form a groove for an O-ring seal 78 to make the fit of the plug to the socket fluid-tight. A retention clip (not shown) but like retention clip 55 is used to hold plug 70 in place.

In FIG. 2, the entering fuel flows into the annular space 66 and then radially inward through media 68 to passage 60. From passage 60, the fuel enters passage 38 that leads to the fuel pressure regulator inlet port 20.

In FIG. 2, the cartridge is serviceable in similar manner to FIG. 1, except that here only a filter cartridge alone need be removed and installed.

Figure 3:
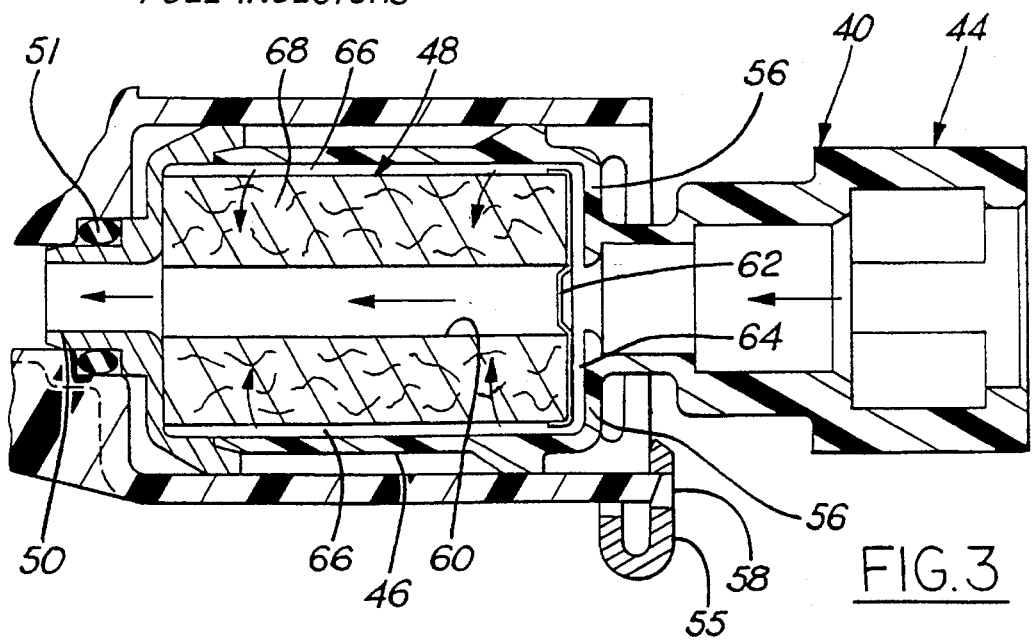
FIG. 3 is a longitudinal cross-sectional view through an inlet end portion of a third embodiment of fuel rail assembly embodying principles of the present invention.

FIG. 3 shows an embodiment like FIG. 1, and like components in the two Figs. are identified by like reference numerals. FIG. 3 differs from FIG. 1 in that the filter cartridge 48 is mounted in an axially opposite configuration from FIG. 1, meaning that the filter cartridge is potted on the annular axial wall of housing 46 from which neck 50 extends and the end that is closed by cover 62 confronts wall 56 to place the space 64 proximate the latter wall. Thus, fuel enters space 64 from the inlet connector fitting and passes to space 66 so that flow through media 68 is from its O.D. to its I.D. where it enters passage 60 from which it flows directly out through neck 50. For the illustrated tubular design, such radially inward flow enables a larger surface area to be presented to the unfiltered fuel than does radially outward flow.

While a presently preferred embodiment has been illustrated and described, principles are applicable to any embodiment falling with the scope of the following claims.

What is claimed is:

1. A fuel filter and pressure regulator assembly operatively connected to the inlet of a fuel rail for an internal combustion engine comprising:

a fuel pressure regulator;

a first socket means for supporting in fluid tight relationship said pressure regulator having an inlet and an outlet;

housing means having a fuel receiving inlet, a cylindrical socket in fluid communication with said inlet and an outlet for discharging fuel from said housing to the inlet of a fuel rail, said first socket means connected in fluid communication with said housing means;

filter housing means having an inlet and an outlet and disposed in said cylindrical socket;

a filter cartridge in said filter housing means for filtering foreign material from fuel before the fuel is discharged to said outlet of said filter housing, said cartridge having tubular filter media with an O.D. surface and an I.D. surface, said filter cartridge and said filter housing means are constructed and arranged such that fuel flow through said filter cartridge is constrained to flow from said inlet of said filter housing radially between said I.D. and said O.D. surfaces of said media and through said outlet of said filter housing; and means for retaining said filter housing means in said cylindrical socket;

said inlet of said pressure regulator receiving all of the discharged fuel from said outlet of said filter housing means and said outlet of said pressure regulator in fluid communication with the inlet of the fuel rail.

2. A fuel filter and pressure regulator assembly as set forth in claim 1 characterized further in that said filter cartridge comprises a central passage bounded by said I.D. surface, and imperforate means closing one axial end of said passage and an adjoining annular axial end face of said media.

3. A fuel filter and pressure regulator assembly as set forth in claim 2 characterized further in that said imperforate means comprises an annular imperforate wall that is an integral part of said filter cartridge and disposed against said annular axial end face of said media, and said means for retaining is a closure means that closes an open axial end of said cylindrical socket to retain said cartridge in a fluid tight relationship in said cylindrical socket.

4. A fuel filter and pressure regulator assembly as set forth in claim 3 characterized further in that said closure means is a plug for closing said cylindrical socket in a fluid-tight relationship, said plug being removable for allowing replacement of said filter cartridge.

5. A fuel filter and pressure regulator assembly as set forth in claim 3 characterized further in that said cylindrical socket and said cartridge are constructed and arranged such that fuel flows through said media in a radially inward direction.

6. A fuel filter and pressure regulator assembly as set forth in claim 2 characterized further in that said central passage comprises another axial end opposite said one axial end, and said another axial end is open to said inlet so that fuel that has entered said inlet thereafter enters said passage at said another axial end and flows radially outward through said media.

7. A fuel filter and pressure regulator assembly as set forth in claim 6 characterized further in that said filter housing means has a fluid connection fitting that is in fluid communication with said central passage of said filter cartridge.

8. A fuel filter and ,pressure regulator assembly as set forth in claim 7 characterized further in that said filter housing has an outlet opposite said inlet that is fitted by a fluid-tight joint to an interior portion of said cylindrical socket, and said fuel passes through said outlet after having been filtered by said media.

* * * * *